United States Patent Office

3,761,468
Patented Sept. 25, 1973

3,761,468
RIFAMYCIN
Nicola Maggi, Milan, Italy, assignor to Gruppo
Lepetit S.p.A., Milan, Italy
No Drawing. Continuation-in-part of abandoned application Ser. No. 785,377, Dec. 19, 1968. This application Feb. 16, 1971, Ser. No. 115,840
Claims priority, application Italy, Dec. 19, 1967,
24,080/67
Int. Cl. C07d 41/06
U.S. Cl. 260—239.3 P                10 Claims

ABSTRACT OF THE DISCLOSURE

A new class of rifamycins, containing a dihydroquinazoline ring, is described. The compounds display a high anti-bacterial activity against pathogenic Gram-positive and Gram-negative microorganisms, and are prepared by reacting a Mannich base of rifamycin S with a lower alkonoic acid.

---

This application is a continuation-in-part of our copending application Ser. No. 785,377 filed Dec. 19, 1968, now abandoned.

This invention relates to a new class of rifamycins and to their preparation.

More particularly, the new rifamycins the present invention is concerned with, are represented by the general formula:

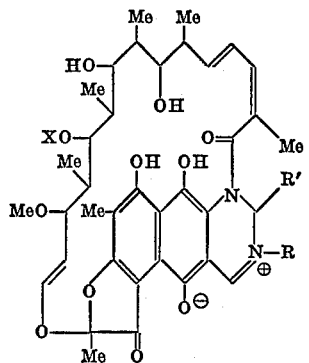

wherein R represents lower alkyl, lower aralkyl or aryl, R' has the same significances and moreover can be hydrogen, while X represents hydrogen or acetyl.

The process for preparing the new rifamycins consists in treating a Mannich base of rifamycin S of the formula

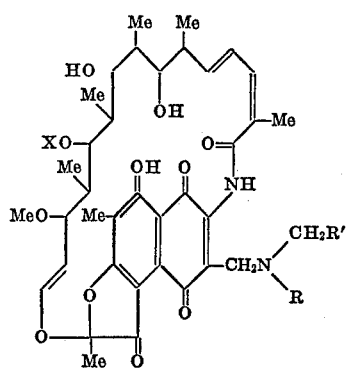

wherein R, R' and X have the above significances, with a lower alkanoic acid in an anhydrous solvent selected among lower alkanes and alkenes and chloroderivatives thereof. such as, for instance, hexane, heptane, hexenes, heptenes, chloroform, dichloroethane, carbon tetrachloride and tetrachloroethylene in a nitrogen atmosphere, at a temperature not exceeding 50° C., for a period ranging, according to the selected temperature, from few hours to 25–30 hours. During the course of this treatment, the starting Mannich base of rifamycin S, which is dissolved in the solvent, is converted gradually into the dihydroquinazoline-rifamycin of the invention, which precipitates and is collected, or does not precipitate, in which case it is isolated in different ways by extracting the residue, obtained by evaporating the reaction solvent to dryness.

The starting Mannich bases of rifamycin S are known substances, which are prepared generally from the Mannich bases of rifamycin SV, as well as from rifamycin S itself.

All these Mannich bases and the relevant reactions are described by Maggi and coll. in Journal of Medicinal Chemistry, 8, 790 (1965), by oxidation with different types of oxidizing agents, as for example oxygen in the presence of catalysts, manganese dioxide, hydrogen peroxide, sodium persulfate, nitrous acid, ceric chloride, quinones, peroxides, persalts, and many others. Sometimes it can be preferable not to isolate at pure state the Mannich base of rifamycin S thus obtained, but, after evaporating to dryness the reaction medium in which the oxidation has taken place, and if necessary after removing the inorganic substances present, one can dissolve the residue in the solvent selected for the reaction and go on with the conversion of the crude Mannich base of rifamycin S thus obtained, into the desired dihydroquinazoline-rifamycin, according to the above-mentioned process.

The dihydroquinazoline-rifamycins are new substances of high antibacterial activity against pathogenic Gram-positive and Gram-negative microorganisms, as for example *Staphylococcus aureus, Streptococcus pyogenes, Diplococcus pneumoniae, proteus vulgaris, Escherichia coli* and against myco-bacteria, particularly *Mycobacterium tuberculosis* $H_{37}R_v$.

The invention compounds when tested in mice against *Staphylococcus aureus* infections display $ED_{50}$ values ranging from 1 to 2 mg./kg. per os. The $LD_{50}$ values range from 1000 to 2200 mg./kg. per os.

The following examples are given for a better illustration of the invention.

EXAMPLE 1

Rifamycin of Formula 1 wherein $R=C_2H_5$, $R'=CH_3$, $X=$acetyl

A solution of 10 g. of 3-diethylaminoethyl-rifamycin SV in 200 ml. of chloroform is oxidized with oxygen under a pressure of 1,2-1,4 atmospheres in the presence of 2.5 g. of 10% palladium on charcoal at 10° C. under agitation for 1 hour. The mixture is filtered and the filtrate is evaporated to dryness in vacuo. The residue, consisting of crude 3-diethyl-aminomethyl-rifamycin S, is dissolved in 325 ml. of a 7.5% acetic acid solution in anhydrous carbon tetrachloride. The solution is stirred at 22–24° C. under nitrogen for 15 hours. A brown precipitate is slowly formed which is collected and dried in vacuo at 35–40° C. M.P. 225° C. (with decomposition). The UV spectrum shows the following absorption maxima:

$\lambda_{max}$: 225 m$\mu$; 276 m$\mu$; 310 m$\mu$; 335 m$\mu$; 565 m$\mu$.
e: 37,400; 18,460; 14,880; 15,270; 11,300.

EXAMPLE 2

Rifamycin of Formula I wherein $R=C_2H_5$, $R'=CH_3$, $X=$acetyl

The same compound of Example 1 is prepared using manganese dioxide as the oxidizing agent. To a solution of 10 g. of 3-diethylaminomethyl-rifamycin SV in 100 ml. of chloroform 10 g. of MnO$_2$ are added. The mixture is cooled at 10° C., stirred at 10–15° C. for 40 minutes, then the manganese dioxide is filtered off and the filtrate is concentrated to dryness in vacuo. The residue is taken up with 70 ml. of ethyl acetate and the solution is concentrated to volume of about 10 ml. The violet precipitate, which forms on cooling, is the manganous salt of 3-diethylaminomethyl-rifamycin S. It is collected, dried in vacuo at 40° C. and dissolved in 43 ml. of a 1:1 mixture of acetic acid-carbon tetrachloride, then diluting the solution with 450 ml. of carbon tetrachloride. The mixture stirred at 20–22° C. overnight under a nitrogen atmosphere, then the formed precipitate is collected dried at 40° C. in vacuo and the present manganous acetate is removed by washing with water. The dried product has the same characteristics reported in Example 1.

EXAMPLE 3

Rifamycin of Formula I wherein R=C$_3$H$_7$, R'=C$_2$H$_5$, X=acetyl

Prepared as described in Example 1, starting from 3-dipropylaminomethyl-rifamycin SV. The product melts between 174° C. and 191° C. with decomposition and shows the following U.V. spectrum absorption maxima.

$\lambda_{max}$: 225 m$\mu$; 275 m$\mu$; 310 m$\mu$ (pH 7.38); 335 m$\mu$; 572 m$\mu$.

$\epsilon$: 41,000; 21,870; 17,270; 17,510; 12,830.

EXAMPLE 4

Rifamycin of Formula I wherein R=C$_2$H$_5$, R'=CH$_3$, X=H

Prepared as described in Example 1, starting from 25-desacetyl-3-diethylaminomethyl-rifamycin SV. The product melts between 186° C. and 193° C. with decomposition and shows the following U.V. spectrum absorption maxima:

$\lambda_{max}$: 227 m$\mu$; 273 m$\mu$; 306 m$\mu$ (pH 7.38); 335 m$\mu$; 565 m$\mu$.

$\epsilon$: 39,490; 19,600; 16,730 17,110; 12,840.

EXAMPLE 5

Rifamycin of Formula I wherein R=CH$_2$—C$_6$H$_5$, R'=H, X=acetyl

Prepared as described in Example 1, starting from 3-(N-benzyl-N-methyl-aminoethyl)-rifamycin SV. The product melts between 198° and 205° C. with decomposition and shows the following U.V. spectrum absorption maxima.

$\lambda_{max}$. 310 m$\mu$ (pH 7.0); 348 m$\mu$; 575 m$\mu$.

$\epsilon$: 15,600; 17,300; 12,900.

EXAMPLE 6

Rifamycin of Formula I wherein

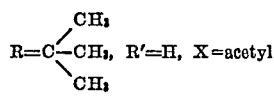

R=C—CH$_3$, R'=H, X=acetyl

Prepared as described in Example 1, starting from 3-(N-methyl-N-t.butyl-aminomethyl)-rifamycin SV. The product melts between 188 and 198° C. with decomposition and shows the following U.V. spectrum absorption maxima $\lambda_{max}$: 310 m$\mu$ (pH 6.24); 355 m$\mu$; 575 m$\mu$.

$\epsilon$: 15,000; 16,400; 11,100.

I claim:

1. A dihydroquinazoline rifamycin of the formula

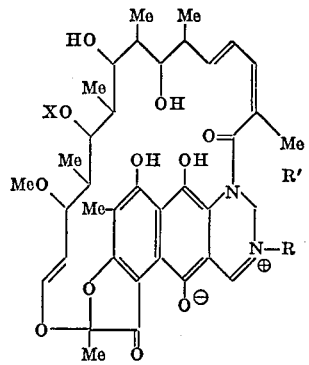

wherein R represents lower alkyl and benzyl, R' is hydrogen or lower alkyl while X represents hydrogen or acetyl.

2. A dihydroquinazoline-rifamycin of the formula set forth in claim 1, wherein R is ethyl, R' is methyl and X is acetyl.

3. A dihydroquinazoline-rifamycin of the formula set forth in claim 1, wherein R is propyl, R' is ethyl and X is acetyl.

4. A dihydroquinazoline-rifamycin of the formula set forth in claim 1, wherein R is ethyl, R' is methyl and X is hydrogen.

5. A dihydroquinazoline-rifamycin of the formula set forth in claim 1, wherein R is t-butyl, R' hydrogen and X is acetyl.

6. A process for preparing a dihydroquinazoline-rifamycin of the formula

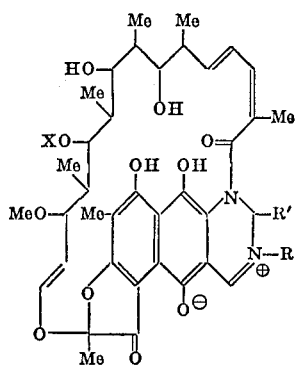

wherein R represents lower alkyl and benzyl, R' is hydrogen or lower alkyl, X represents hydrogen or acetyl, which consists in treating the Mannich base of rifamycin S of the formula

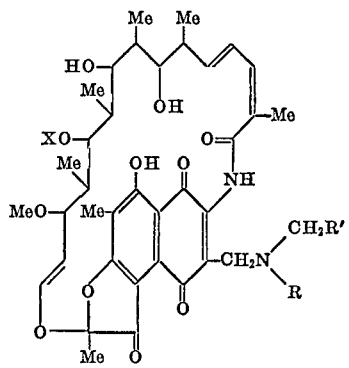

wherein R, R' and X have the above significance with a lower alkanoic acid in an anhydrous solvent selected among lower alkanes and alkenes and chloroderivatives thereof, in a nitrogen atmosphere, at a temperature not exceeding 50° C.

7. A process as in claim 6, wherein the Mannich base of rifamycin S is 3-diethylaminomethyl-rifamycin S.

8. A process as in claim 6, wherein the Mannich base of rifamycin S is 3-dipropylaminomethyl-rifamycin S.

9. A process as in claim 6, wherein the Mannich base of rifamycin S is 25 - desacetyl-3-diethylaminomethyl-rifamycin S.

10. A process as in claim 6, wherein the Mannich base of rifamycin S is 3 - (N-methyl-N-t-butyl-aminomethyl)-rifamycin S.

References Cited
UNITED STATES PATENTS 3,524,845   8/1970   Bickel et al. _____ 260—210 AB LEWIS GOTTS, Primary Examiner J. R. BROWN, Assistant Examiner U.S. Cl. X.R.

424—251